United States Patent
Wang et al.

[19]

[11] Patent Number: 5,832,296
[45] Date of Patent: Nov. 3, 1998

[54] WEARABLE CONTEXT SENSITIVE USER INTERFACE FOR INTERACTING WITH PLURALITY OF ELECTRONIC DEVICES OF INTEREST TO THE USER

[75] Inventors: Weijia Wang, Sunnyvale; Lee Felsenstein, Palo Alto, both of Calif.

[73] Assignee: Interval Research Corp., Palo Alto, Calif.

[21] Appl. No.: 429,343

[22] Filed: Apr. 26, 1995

[51] Int. Cl.$^6$ .................................................. G06F 15/02
[52] U.S. Cl. ..................................... 395/823; 340/825.52
[58] Field of Search .......................... 341/22, 23; 455/89, 455/344; 345/156, 179, 158; 360/69; 340/706, 825.44, 825.52; 395/500, 750, 821–823; 379/58, 61, 59; 342/457; 348/12

[56] References Cited

U.S. PATENT DOCUMENTS

| | | | |
|---|---|---|---|
| 4,354,189 | 10/1982 | Lemelson | 340/825.31 |
| 4,500,933 | 2/1985 | Chan | 360/69 |
| 4,641,374 | 2/1987 | Oyama | 455/603 |
| 4,722,625 | 2/1988 | O'Brien | 401/6 |
| 4,725,827 | 2/1988 | Gallegos, Jr. et al. | 340/696 |
| 4,754,268 | 6/1988 | Mori | 340/710 |
| 4,825,200 | 4/1989 | Evans et al. | 341/23 |
| 4,844,475 | 7/1989 | Saffer et al. | 273/311 |
| 4,905,001 | 2/1990 | Penner | 341/20 |
| 4,924,216 | 5/1990 | Leung | 340/709 |
| 4,954,817 | 9/1990 | Levine | 340/706 |
| 4,988,981 | 1/1991 | Zimmerman et al. | 340/709 |
| 5,005,460 | 4/1991 | Suzuki et al. | 84/600 |
| 5,012,520 | 4/1991 | Steeger | 381/68 |
| 5,038,144 | 8/1991 | Kaye | 341/176 |
| 5,079,629 | 1/1992 | Oz | 358/100 |
| 5,097,252 | 3/1992 | Harvill et al. | 340/540 |
| 5,105,708 | 4/1992 | Suzuki et al. | 84/600 |
| 5,159,713 | 10/1992 | Gaskill et al. | 455/344 |
| 5,184,319 | 2/1993 | Kramer | 364/806 |
| 5,201,067 | 4/1993 | Grube et al. | 455/89 |
| 5,204,670 | 4/1993 | Stinton | 340/825.54 |
| 5,212,372 | 5/1993 | Quick et al. | 235/476 |
| 5,214,615 | 5/1993 | Bauer | 367/128 |
| 5,218,367 | 6/1993 | Sheffer et al. | 342/457 |
| 5,228,137 | 7/1993 | Kleinerman et al. | 395/500 |
| 5,251,903 | 10/1993 | Bixler et al. | 273/26 R |
| 5,272,324 | 12/1993 | Blevins | 235/462 |
| 5,280,265 | 1/1994 | Kramer et al. | 338/210 |
| 5,404,544 | 4/1995 | Crayford | 395/750 |
| 5,420,910 | 5/1995 | Rudokas et al. | 379/59 |
| 5,444,462 | 8/1995 | Wambach | 345/158 |
| 5,450,079 | 9/1995 | Dunnaway | 341/23 |
| 5,459,489 | 10/1995 | Redford | 345/179 |
| 5,481,265 | 1/1996 | Russell | 341/22 |
| 5,489,922 | 2/1996 | Zloof | 345/156 |
| 5,515,419 | 5/1996 | Sheffer | 379/58 |
| 5,572,573 | 11/1996 | Sylvan et al. | 379/61 |
| 5,646,608 | 7/1997 | Shintani | 340/825.52 |

OTHER PUBLICATIONS

Kantek, Inc., Spectrum, Ring Mouse, The User's Manual, PC Version, 1994.

*Primary Examiner*—Moustafa M. Meky
*Attorney, Agent, or Firm*—Brooks & Kushman P.C.

[57] ABSTRACT

A wearable universal user interface device is provided for interacting with a variety of electronic apparatus. The interface device includes various sensors, such as a temperature sensor, pressure sensor, and a two-dimensional quadrant force sensor. The interface device also includes processing circuitry, a wireless transmitter, and an optional receiver. In the preferred embodiment, the interface device is in the form of a ring adapted to be worn on the finger of a user. The device is operated by the wearer's fingers and thumb. Preferably, the interface device includes an internally mounted pressure sensor and an externally mounted two-dimensional force sensor. The body of the ring itself serves as an omnidirectional loop antenna for transmission and reception of signals. Representative applications of the interface device include use as a wireless computer mouse, a remote controller for a television, stereo, VCR, or the like.

14 Claims, 3 Drawing Sheets

Fig. 1
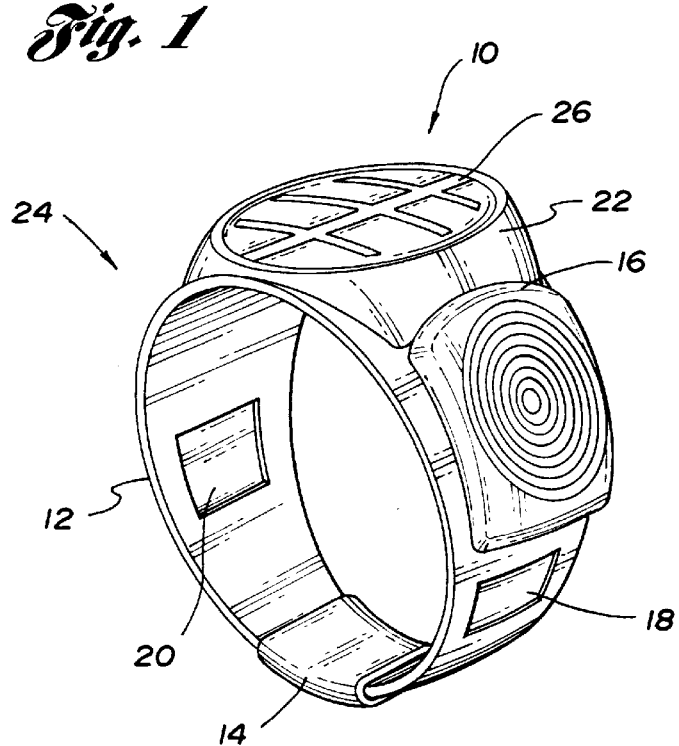
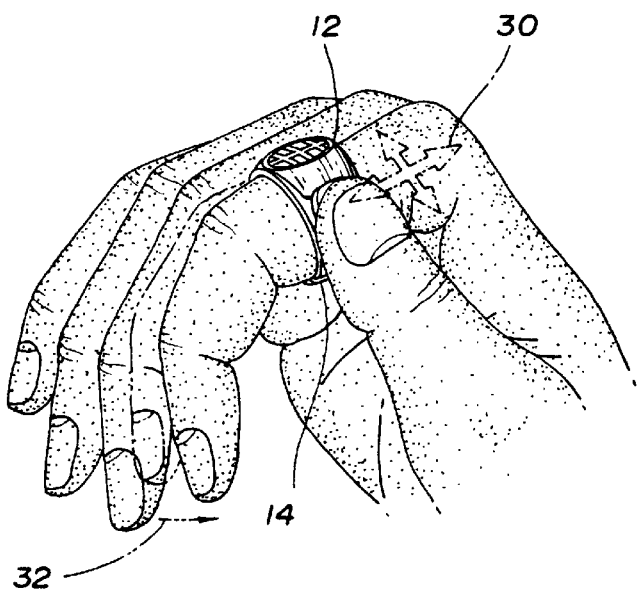
Fig. 2

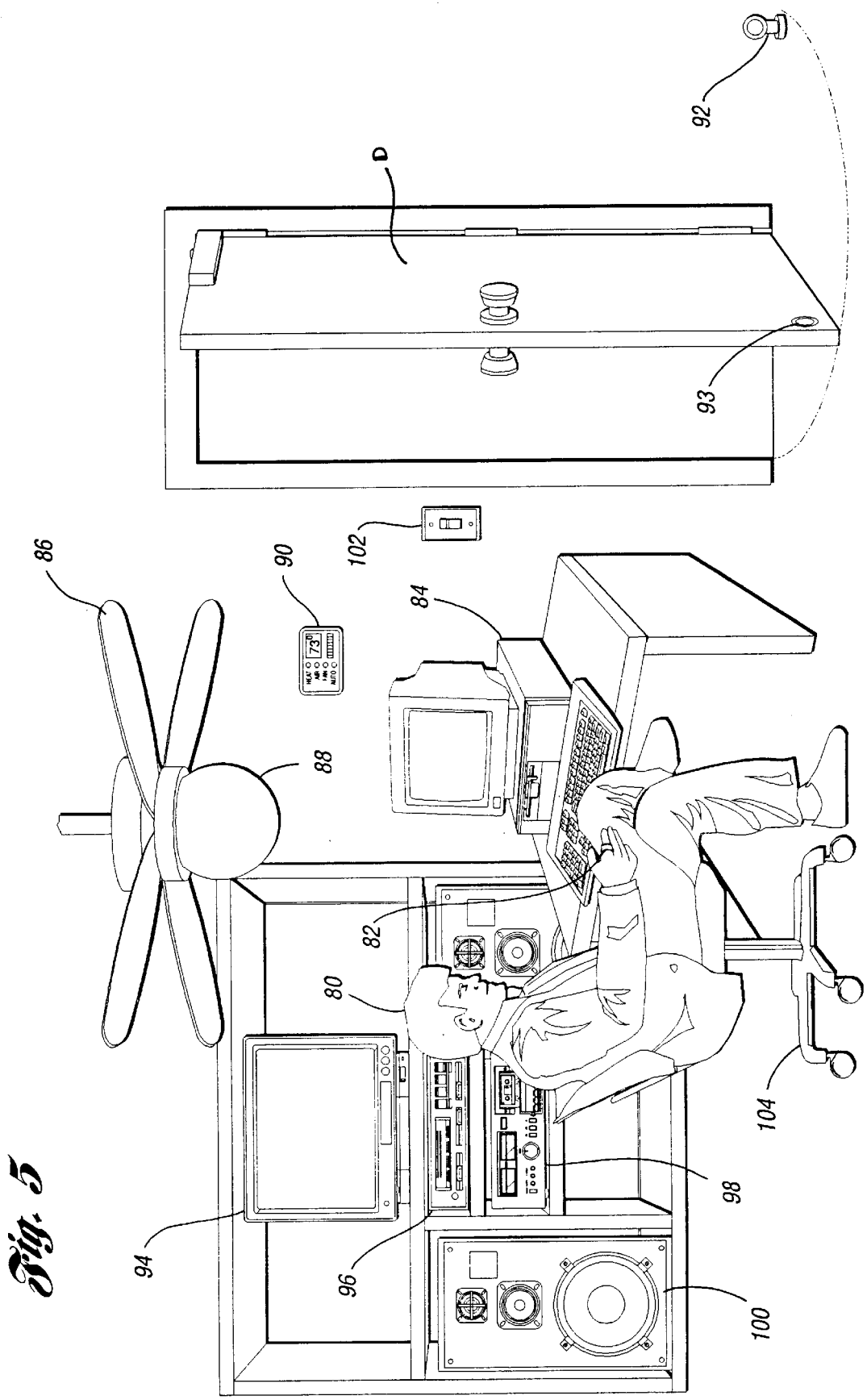

5,832,296

WEARABLE CONTEXT SENSITIVE USER INTERFACE FOR INTERACTING WITH PLURALITY OF ELECTRONIC DEVICES OF INTEREST TO THE USER

TECHNICAL FIELD

The present invention relates to a context sensitive wireless universal interface device for communicating with various types of electronic equipment.

BACKGROUND ART

As electronic devices continue to become smaller, more sophisticated, and less expensive, they also become more ubiquitous. The flexibility and functionality of electronics, especially microprocessors, makes them useful in a variety of applications. An average individual in the United States encounters and interacts with a myriad of electronic devices virtually every day. The number of such devices can be attributed to the desire to make everyday tasks more reliable, convenient, and available.

Due to the wide variety of applications, each electronic apparatus typically utilizes a dedicated user interface to receive information from, and communicate information to, the user. Depending upon the complexity of the particular task being performed by the electronic device, the user interface may be simple or complex. For example, an automatic door may use an infrared beam or a pressure sensitive mat for activating the device, i.e. the door. A user communicates the desire to open the door to the electronic system by stepping on the mat or by breaching the infrared beam. This type of interface is relatively simple since little information needs to be exchanged between the user and the device to accomplish the desired function. Furthermore, the device does not identify or discriminate among most users. Thus, the door will open whether a person or an animal crosses the path of the beam or presses on the mat. However, the infrared beam may discriminate among users based on height and the mat may discriminate among users based on weight.

Some applications require an exchange of more information, such as a unique identification of the user. For example, an automated teller machine (ATM) requires each user to be uniquely identified before completing any banking transactions. This is typically accomplished utilizing magnetic media to communicate an identification code which the user must verify. Once identified, the user communicates with the ATM via a keyboard having number and function keys. The ATM typically communicates with the user via a video display, audio signals, and via printed receipts. Thus, the user interface is more complex due to the amount of information required to be exchanged and due to the requirement of uniquely identifying each user.

Countless other applications utilize electronics to communicate with a user and to effect control of various functions. One of the more prominent applications is the microcomputer which utilizes a wide variety of media to communicate information. A typical multi-media computer may utilize magnetic or optical media for information storage and retrieval, a pointing device such as a mouse, trackball, digitizer or touch pad, a keyboard, speakers to provide audio output, and a monitor to provide video output (and input in the case of touch sensitive video screens), among other similar devices. Thus, the substantial amount of information and the relatively wide range of information formats require a sophisticated user interface. In addition, many applications utilizing computers also require the user to uniquely identify herself before processing any further information.

A number of devices utilize a dedicated remote control device which transmits control information via an electromagnetic signal at a specific frequency. These devices may utilize infrared, ultrasonic, radiowave, or other suitable frequencies depending on the range of transmission, the position of the receiver, and the available (unused) frequencies of the electromagnetic spectrum. Such devices include remote controlled televisions, audio equipment, video cassette recorders, automobile keyless entry systems, alarms, and garage door openers.

These remote controllers are intended to make operation of the associated device more convenient for the user. However, many users become intimidated or frustrated with a number of different controllers which each have different operational features. As a result, a user often uses only the most basic functions of each device. Also, the design of these devices is often dictated by an associated required functionality rather than by aesthetic considerations. As such, these devices are frequently inharmonious with their intended application environment. Furthermore, the convenience of a particular remote control device is a function of the time it takes to locate the device and the subsequent time it takes to determine the proper sequence of actions to accomplish the desired function.

For example, consider a user who wants to watch the nightly news on a remotely controlled television. First, the user must find the appropriate remote control device. This task may be more arduous than one might first expect, especially if the household contains a number of users. Once the appropriate device is located, the user must ascertain which buttons to push to turn the television on and tune it to the proper channel. The technological "convenience" provided by the remote control may require more time and effort than walking to the television and simply selecting the appropriate channel manually.

Similarly, various application programs which run on general purpose microcomputers have customized user interfaces. Although the applications are designed to conveniently increase the efficiency of the user and to automate mundane tasks, a user often expends a great deal of time and effort learning how to use the application program. Thus, a user may select a particular program, or a particular input/output device, based on the convenience of the associated user interface. The trend in computer software is to provide more uniform user interfaces so that the user does not have to waste time in learning how to interact with the device to instruct it to perform a desired function. It is also desirable for various other electronic devices, such as those described above, to have a common user interface with uniform control functions. Such a universal interface preferably should be relatively effortless to operate regardless of the particular application or function being performed.

SUMMARY OF THE INVENTION

Thus, it is an object of the present invention to provide a universal interface device for exchanging information between a user and various electronic apparatus.

Another object of the present invention is to provide a universal interface device having uniform controls for interacting with a number of diverse electronic devices.

A further object of the present invention is to provide a context sensitive interface device which communicates with electronic apparatus in its immediate environment to determine what function is being requested by the user.

Yet another object of the present invention is to provide an aesthetically pleasing universal interface device which blends well with a number of different operating environments.

A still further object of the present invention is to provide an easily accessible, immediately available universal interface device for use with a number of diverse electronic products.

An additional object of the present invention is to provide a universal interface device which can be carried at all times and be comfortably manipulated in an unobtrusive manner to the user and to others.

Another object of the present invention is to provide a universal user interface device which allows the user to be uniquely identified by various electronic apparatus.

A further object of the present invention is to provide a universal interface device in the form of a ring which can be worn on a finger for communicating information to intelligent devices of interest to the user.

In carrying out the above objects and other objects and features of the present invention, a universal user interface is provided for interacting with at least one electronic device of interest to the user. The interface includes a ring having a processor in communication with a memory and a transmitter for transmitting identification and control information to the electronic device. The ring includes at least one sensor for receiving input from the user indicative of a control command.

There are numerous advantages accruing to the present invention. Providing a universal user interface in the form of a finger-ring affords availability, immediacy, pleasing aesthetics, unobtrusiveness, and comfort to the user. Another advantage of the universal user interface of the present invention is realized by embedding electronics within a finger-ring to allow selective storage and retrieval of identification information or value information which may be utilized in various business transactions. A still further advantage of the present invention results from embedding a wireless transmitter (radio, infrared, optical, ultrasonic, or the like) within a ring functioning as a universal user interface so as to allow transmission of control information in addition to identification information.

An additional advantage of the present invention realized in an alternative embodiment results from embedding a wireless receiver in a universal user interface finger-ring such that the ring can receive information from its environment and utilize received information to determine context specific control functions. Furthermore, using the entire metal ring as a loop antenna for both a radio transmitter and receiver reduces the required size of the ring while providing a sufficient communication range for numerous applications.

The above objects and other objects, features, and advantages of the present invention will be readily appreciated by one of ordinary skill in this art from the following detailed description of the best mode for carrying out the invention when taken in connection with the accompanying drawings.

BRIEF DESCRIPTION OF THE DRAWINGS

FIG. 1 is a perspective view of a universal user interface device according to the present invention;

FIG. 2 is a perspective view illustrating use of a universal user interface device according to the present invention;

FIG. 5 is a pictorial representation of a universal user interface device according to the present invention as utilized in a typical operating environment.

BEST MODE FOR CARRYING OUT THE INVENTION

Figure 3:
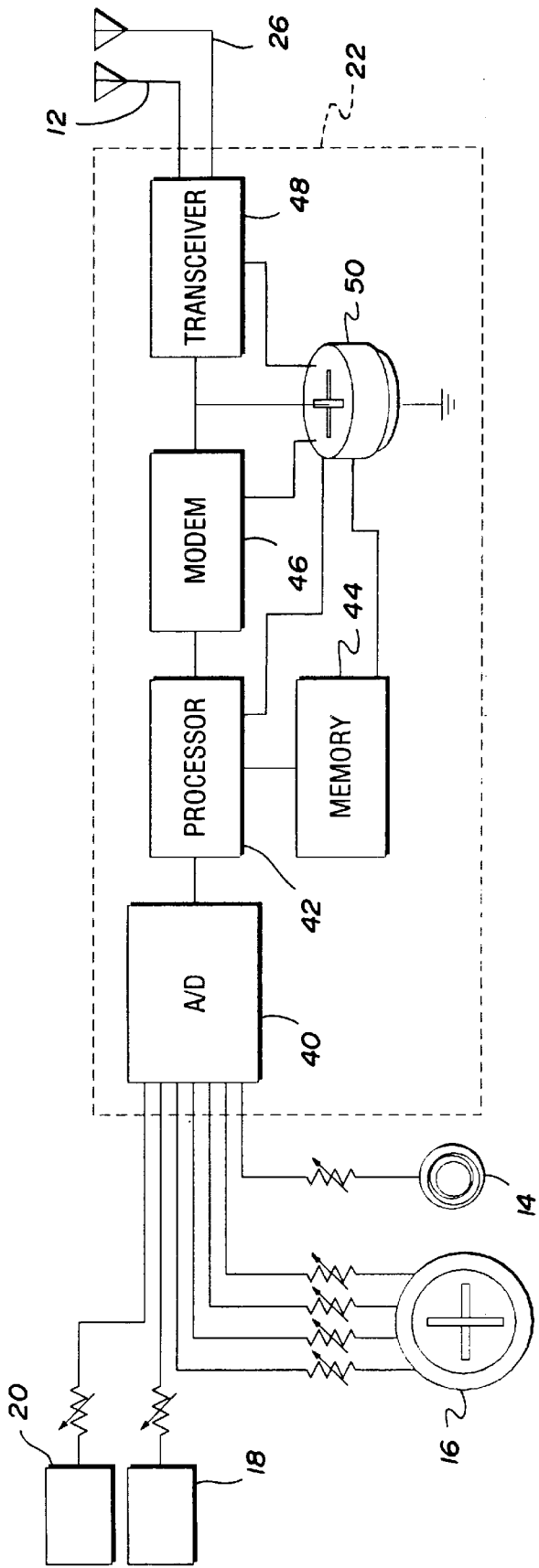
FIG. 3 is a block diagram of a universal user interface device according to the present invention.

Referring now to FIG. 1, a perspective view of a universal user interface according to the present invention is shown. As illustrated, in the preferred embodiment, a universal user interface 10 is contained within and/or about a ring 12 which may be worn on a finger. Of course, the present invention transcends the particular wearable chosen to house the universal user interface 10. Thus, the present invention is not limited to a ring per se, but may be contained within any of a number of wearables such as a watch, a bracelet, or the like. The universal user interface of the present invention is designed to be carried at all times so as to provide a previously unequalled level of convenience since the device is immediately available without having to locate, reach, or pick-up anything. Also, the present invention requires only small physical movements for its operation thereby providing for unobtrusive manipulation by the user without detection by others.

With continuing reference to FIG. 1, ring 12 may function as a loop antenna to transmit and receive omnidirectional signals, as explained in greater detail below. Ring 12 preferably includes an internal pressure sensor 14 which may be positioned anywhere around the inside diameter of ring 12. Preferably, pressure sensor 14 is a thick-film pressure sensor disposed within the inner diameter of ring 12. A two-dimensional force (or pressure) sensor 16 is positioned on the outside diameter of the ring to facilitate operation by the wearer as explained in greater detail below with reference to FIG. 2. Preferably, sensor 16 is a standard isometric two-dimensional quadrant force sensor (best shown in FIG. 3). In one embodiment, additional sensors, such as a temperature sensor 18 and a pulse sensor 20 are provided for advanced features of the universal interface device 10. The various sensors and the loop antenna are in electrical communication with a transmitter/receiver and processing electronics which are enclosed within housing portion 22 of ring 12.

As also illustrated in FIG. 1, the transmitter/receiver within housing portion 22 may emit or receive an omnidirectional signal, indicated generally by curvilinear lines 24. These signals may facilitate the exchange of information between the user and an electronic device or may provide power to the electronics within housing portion 22. For example, in one embodiment, passive electronics are disposed within housing portion 22 and are operated by changing characteristics of resonant circuits which are excited by externally generated electromagnetic fields. In this embodiment, ring 10 is electromagnetically coupled with various electronic devices within close proximity.

In another embodiment, housing portion 22 contains a small battery 50 (illustrated in FIG. 3) to provide power to active electronics also contained therein. The battery may be recharged by inductive coupling at a compatible charging station (not shown). Alternatively, a disposable battery, such as a lithium battery or the like may be utilized. Universal interface device 10 may also include a directional antenna 26 within or about housing portion 22 of ring 12. Directional antenna 26 provides additional functionality and facilitates context identification, as explained in greater detail below.

Referring now to FIG. 2, operation of a universal interface device according to the present invention is illustrated. Preferably, ring 12 is worn on the index finger I of the hand H of a user. This allows the user to easily manipulate force sensor 16 with his or her thumb as indicated by two-dimensional arrows 30. The processing electronics disposed within housing portion 22 process the information received from sensor 16 and communicate with an appropriate electronic device proximate to the user. Preferably, interface device 10 has a communication range of about ten meters.

With continuing reference to FIG. 2, pressure sensor 14 (best illustrated in FIG. 1) provides an additional input for the user to communicate with an electronic device. When the user flexes index finger I, as indicated generally by arrow 32, the shortening of the muscle circumscribed by ring 12 increases the pressure therein. Pressure sensor 14 detects the pressure increase and communicates this information to the processing electronics disposed within housing 22. The analog signal produced by pressure sensor 14 may be calibrated and converted to a digital signal by the processing electronics so that a trigger signal is produced when the pressure exceeds an adjustable threshold. This trigger signal is then communicated to an electronic apparatus to remotely actuate the apparatus.

Referring now to FIG. 3, a block diagram of a universal user interface device according to the present invention is shown. The various sensors of device 10, such as pressure sensor 14, two-dimensional force sensor 16, temperature sensor 18, and pulse sensor 20, are in electrical communication with an analog to digital (A/D) converter 40 disposed within housing portion 22. The A/D converter 40 transforms the analog signals to digital signals and communicates the digital signals to a processor 42. Of course, a number of A/D converters may be utilized depending on the particular characteristics of the signals generated by the various sensors. Preferably, processor 42 is a microprocessor to provide flexibility and adaptability. However, processor 42 may also be an application specific integrated circuit (ASIC) which may be designed to utilize significantly less power than a general purpose microprocessor. Universal interface device 10 may be configured to accommodate varying levels of functionality.

With continuing reference to FIG. 3, processor 42 is connected to a memory 44 which is utilized for storage and retrieval of various information including operating instructions, user identification codes, security access codes, and the like. Modem 46 provides modulation and demodulation of signals to implement any of a number of standard communications protocols. Preferably, a serial communication protocol is utilized, such as the RS-232 protocol. Modem 46 transfers signals to transceiver 48 which conditions the signals for transmission at an appropriate frequency via omnidirectional antenna (ring) 12 or via directional antenna 26. A battery 50 provides power to the various electronic components and is also disposed within housing portion 22.

In operation, interface device 10 continuously communicates with intelligent electronic devices within close proximity so as to provide context information to the user interface device. Thus, unlike many prior art remote controllers, the interface device of the present invention receives information through transceiver 48 from the objects in its immediate environment which it can control. Processor 42 contains a software state machine which monitors signals received from various devices, changes the current state if necessary, and generates commands based on the received signals and the current state of the state machine. Thus, the commands generated are sensitive to the current environment (context) of the user and the interface device.

For example, consider an intelligent medication storage receptacle, i.e. a smart pill bottle. Each time the bottle is opened, it communicates with the universal interface device and records certain data, such as the type and quantity of the medicine which is dispensed and the identification of the user. The smart pill bottle could provide a warning or automatically lock if the user attempts to take the medication at the wrong time of day, or has already taken the appropriate medication for that day.

As also illustrated in FIG. 3, processor 42 communicates with temperature sensor 18 and pulse sensor 20. Temperature sensor 18 is operative to sense the ambient temperature about the user. In an automatic control mode, the universal interface device can communicate with the heating/cooling system to adjust the ambient temperature to a desired temperature determined by the user. Pulse sensor 20 is positioned on the interior surface of ring 12 so that it is in direct contact with the finger of the user. Pulse sensor 20 measures the pulse rate and time profile and may be used to uniquely identify the user. All functions of the ring will be disabled if the expected pattern cannot be detected. This provides a built-in security measure to prevent unauthorized operation and/or access to the various electronic devices which the interface can control.

With continuing reference to FIG. 3, processor 42 provides for a self-learning or programming mode so that the universal interface device may adapt to various new or pre-existing electronic devices. Typically, each electronic device has unique commands and/or communication protocols so that one remote controller can only control its associated device. The universal user interface device of the present invention includes means for learning these command sequences when the user wants to control a previously unrecognized device. This feature is similar to that provided by commercially available universal remote controllers.

Figure 4:
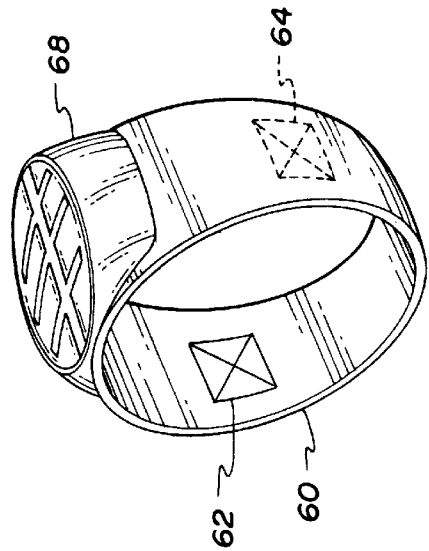
FIG. 4 is a perspective view of an alternative embodiment for a universal user interface device having internal diametrically opposed pressure sensors according to the present invention.

Referring now to FIG. 4, an alternative embodiment of a universal user interface device according to the present invention is shown. In this embodiment, ring 60 includes two diametrically opposed force sensors 62 and 64 in communication with processing electronics disposed within housing portion 68. Both of the opposing force sensors 62 and 64 must be actuated to generate a trigger signal. This arrangement reduces the likelihood of false trigger signals being produced by externally applied forces. For example, if the user is carrying an object or leaning against a wall, the externally applied force will actuate only one of the two force sensors 62 and 64 so that no trigger signal will be produced. However, when the user flexes the ring finger, both force sensors 62 and 64 will be actuated and a trigger signal will be produced.

Of course, ring 60 of FIG. 4 could be configured to include a two-dimensional force sensor, such as sensor 16 of FIG. 1, in addition to other sensors, such as a temperature sensor, pulse sensor, or the like. Ring 60 could also be configured with adjacent sensors such that sequential operation of adjacent sensors provides a direction or motion vector to the device being controlled. Similarly, depending upon the rate of sequential sensor actuation, a velocity vector can be detected and communicated to the device being controlled.

Referring now to FIG. 5, a representative operating environment for a universal user interface device according to the present invention is depicted. User 80 is wearing a universal user interface device 82 which continually communicates with surrounding electronic devices via the omnidirectional antenna described above. Thus, device 82 is responsive to the current electronic environment which includes desktop computer 84, ceiling fan 86, light 88, thermostat 90, doorstop 92, television 94, VCR 96, and audio system 98. Preferably, the interface device continuously receives information from such various electronic devices in the immediate environment and uses the received information to determine the particular context of the user. The particular control signals produced by the interface device will depend upon the particular context.

With continuing reference to FIG. 5, interface device 82 replaces a standard computer mouse to control desktop computer 84. Interface device 82 allows user 80 to express two dimensions of analog control information in addition to a marking or "clicking" action. The two-dimensional control is performed by the actions of the users thumb on the isometric force sensor of interface device 82 while the "clicking" is performed by flexing the finger on which interface device 82 is worn. Interface device 82 is easily manipulated since the movement required by the thumb and the flexing action employ independent muscle movements which do not interfere with each other.

As also indicated in FIG. 5, user 80 may utilize interface device 82 to adjust the ambient temperature of the room. When interface device 82 is pointed at thermostat 90, a communication link is established via the directional antenna described above. The current "set" temperature may then be adjusted via the two-dimensional force sensor of interface device 82. In a similar fashion, interface device 82 may be used to control the various other electronic devices shown. By pointing interface device 82 to a particular device, a different communication link is established and information is exchanged between the controlled device and the interface device.

Thus, user 80 may control fan 86 or light 88 by pointing to the wall switch 102 or to the device itself and flexing a finger to actuate the device. The volume of speakers 100 may be controlled by pointing the interface device 82 to stereo 98 and "clicking" or using the two-dimensional force sensor. Interface device 82 also controls an automatic doorstop 92 to close door D by deactivating an electromagnet which holds door D open via magnetic attraction to metallic plate 93.

Universal user interface device 82 may also be utilized to read or write information to/from electronic memories embedded in various objects. For example, user 80 may utilize interface device 82 to communicate information relative to chair 104 which has an embedded electronic memory. Such information may include the date of purchase, manufacturer, purchase price, or the like.

Since universal user interface device 82 is responsive to the context of the user, and may transmit user identification information to the device being controlled, different levels of control may be available to different users. For example, interface device 82 may be used to control television 94. When a parent uses his interface device to control television 94, all the channels and functions are available. However, when a child utilizes her interface device, only channels and/or functions preselected by the parent are available.

The universal user interface device of the present invention will have comprehensive applications as electronic and informational devices become more pervasive within the environment. Some of the applications within the contemplation of the present invention include using the interface device to interact and operate automatic door openers, automated teller machines, automatic toll booths, home electronics, room environmental control, navigation, tracking, and information access and retrieval. However, the above list of applications is not all-inclusive or exclusive.

As such, it should be understood, of course, that while the forms of the invention herein shown and described constitute the preferred embodiments of the present invention, they are not intended to illustrate all possible forms thereof. It will also be understood that the words used are descriptive rather than limiting, and that various changes may be made without departing from the spirit or scope of the invention as claimed below.

What is claimed is:

1. A context-sensitive user interface for interacting with at least one electronic device of interest to a user, the interface comprising:

at least one sensor for receiving input from the user and producing sensor signals in response thereto;

a memory for storing a set of instructions and identification information;

a receiver for receiving signals from the at least one electronic device when in close proximity thereto to provide context information to the user interface;

a processor in communication with the memory, the receiver, and the at least one sensor for executing the set of instructions, the processor producing control commands for the at least one electronic device based on the context information, the control commands being responsive to the sensor signals;

a transmitter in communication with the processor for transmitting the identification information and the control commands to the electronic device; and at least one antenna in communication with the transmitter for transmitting a signal to the at least one electronic device representative of the identification information and the control commands, wherein the at least one sensor, the memory, the processor, the receiver, and the transmitter are mounted on a device wearable by the user.

2. The user interface of claim 1 wherein the processor is a microprocessor.

3. The user interface of claim 1 wherein the at least one sensor comprises a two-dimensional force sensor.

4. The user interface of claim 1 wherein the at least one sensor, the memory, the processor, the receiver and the transmitter are mounted on a ring wearable on a finger of the user.

5. The user interface of claim 4 wherein the ring functions as one of the at least one antennas.

6. The user interface of claim 1 wherein the at least one antenna comprises a loop antenna.

7. The user interface of claim 1 wherein the at least one sensor produces a signal when the user flexes a finger.

8. A wearable user interface for communicating with a plurality of electronic devices of interest to a user, the interface comprising:

a ring adapted to be worn on a finger of the user;

at least one sensor mounted on the ring for receiving input from the user and producing sensor signals in response thereto;

a memory mounted on the ring for storing digital information;

a receiver mounted on the ring for continuously communicating with each of the plurality of electronic devices being in close proximity thereto to automatically provide context information to the user interface;

a processor mounted on the ring in communication with the memory, the receiver, and the at least one sensor, the processor producing control commands for at least one of the plurality of electronic devices in response to the sensor signals based on the context information; and a transmitter mounted on the ring in communication with the processor for transmitting the digital information and the control commands to the at least one of the plurality of electronic devices.

9. The wearable user interface of claim 8 wherein the processor is a microprocessor.

10. The wearable user interface of claim 8 wherein the at least one sensor comprises a two-dimensional force sensor.

11. The wearable user interface of claim 8 wherein the at least one sensor comprises a two-dimensional force sensor mounted on an external surface of the ring.

12. The wearable user interface of claim 8 wherein the at least one sensor comprises a thick-film pressure sensor mounted on an internal surface of the ring.

13. The wearable user interface of claim 8 wherein the at least one sensor produces a signal when the user flexes the finger.

14. The wearable user interface of claim 8 wherein the at least one sensor comprises a pair of internally mounted spaced pressure sensors, the pressure sensors being positioned so as to resist actuation induced by an externally applied force.

* * * * *

UNITED STATES PATENT AND TRADEMARK OFFICE
CERTIFICATE OF CORRECTION

PATENT NO. : 5,832,296

DATED : November 3, 1998

INVENTOR(S) : WEIJIA WANG, et al.

It is certified that error appears in the above-identified patent and that said Letters Patent is hereby corrected as shown below:

Column 8, Line 49, Claim 5, delete "4" and insert --1--.

Signed and Sealed this

Twenty-fifth Day of May, 1999

Attest:

Q. TODD DICKINSON

Attesting Officer

Acting Commissioner of Patents and Trademarks